United States Patent Office 3,546,694
Patented Dec. 8, 1970

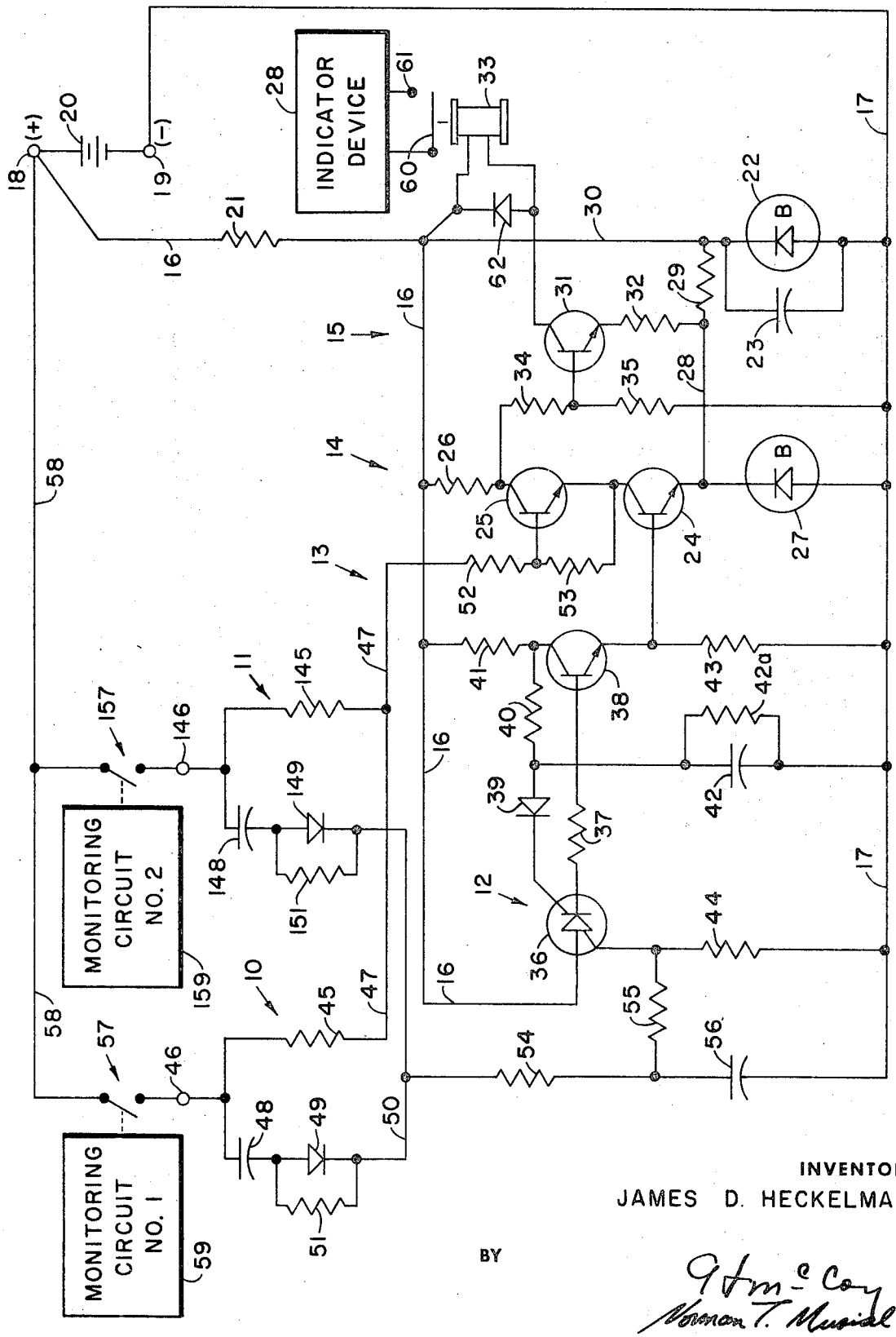

3,546,694
MULTIALARM SUMMARY ALARM
James D. Heckelman, Huron, Ohio, assignor to the United States of America as represented by the Administrator of the National Aeronautics and Space Administration
Filed Apr. 17, 1967, Ser. No. 632,152
Int. Cl. G08b 19/00
U.S. Cl. 340—412
7 Claims

ABSTRACT OF THE DISCLOSURE

An alarm circuit having an indicating device which becomes activated by the opening of a gate circuit having two signal inputs. One of the gate signal inputs is connected to a plurality of fault contact sets. A normally conducting semiconductor switch is connected to the other gate signal inputs. The semiconductor switch is connected through respective pulse forming networks to the fault contact sets in order that the conduction of the semiconductor switch will be briefly interrupted each time a fault contact set closes.

---

The invention described herein was made by an employee of the United States Government and may be manufactured and used by or for the Government for governmental purposes without the payment of any royalties thereon or therefor.

This invention relates to signaling circuits and is directed to an alarm circuit for severally indicating on a single annunciator or indicating device the closure of any of a plurality of fault contacts.

The provision of means for indicating that some parameter being measured has varied beyond prescribed limits is necessary in a wide range of industrial and experimental applications. For example, in a nuclear reactor, electronic circuits are provided to measure temperatures and radiation levels at various points throughout the reactor. Each of these circuits may be provided with a set of fault contacts which close if the parameter being monitored goes out of limits. The fault contact sets are connected to respective annunciators or indicating devices such as lamps or buzzers to activate same when respective fault contacts close.

For purposes of economy and simplicity, it has been a practice of the prior art in some instances to provide circuitry interposed between a plurality of fault contact sets and a single annunciator or indicator channel which is activated upon the occurrence of a fault. The problem with such circuits is that while one set of fault contacts is closed, the subsequent closure of another set will not be indicated. Consequently, a dangerous situation may result in which attempts are made to correct the condition which caused the first fault contacts to close after the fault has already been corrected.

Some prior art circuits have been devised in which after an alarm occurs to indicate a fault, the circuit may be manually reset so that subsequent closure of another set of fault contacts will be indicated. However, when the circuit is reset, all prior fault signals still present are cleared. Thus, if a single fault is cleared by manual reset, no indication will be given when the condition causing the fault is corrected.

Accordingly, it is an object of the invention to provide an improved signaling circuit having a single annunciator or indicator channel.

It is another object of the invention to provide an improved single annunciator alarm circuit for monitoring a plurality of fault contacts, which alarm circuit indicates the subsequent closure of additional fault contact sets after a first set of fault contacts is closed.

It is a further object of the invention to provide circuitry of the above type which briefly interrupts the first alarm signal appearing on the annunciator each time an additional fault contact set closes.

Other objects and advantages of the invention will become apparent from the following description and accompanying drawing in which:

The single figure is a schematic diagram of circuitry embodying the invention.

Referring to the single figure there is shown an embodiment of the invention which may include generally fault signal conditioning circuits 10 and 11, a pulse responsive gate control section 12, an amplifying section 13, a gate section 14 and a phase inverting section 15. The foregoing circuits are energized by means of power leads 16 and 17 which are connected to respective power terminals 18 and 19 across which a D.C. source 20 is connected. A dropping resistor 21 is inserted in the lead 16 to reduce the voltage between the leads 16 and 17 to a level appropriate for the transistors used in the circuits to be described hereinafter. Although NPN transistors are utilized in the instant embodiment of the invention, it will be clear to those skilled in the art that PNP transistors may be substituted by reversing D.C. polarities.

In order to maintain the voltage between the leads 16 and 17 at a constant magnitude, a Zener diode 22 is connected between those leads. A capacitor 23 is bridged across the Zener diode 22 to suppress voltage spikes which might appear between the leads 16 and 17 to the detriment of any semiconductors energized therefrom.

The gate circuit 14 is formed by a pair of NPN type transistors 24 and 25, the collector-emitter paths of which are serially connected with a load resistor 26 and a Zener diode 27 between the leads 16 and 17. As will be explained presently, both transistors 24 and 25 must conduct concurrently in order to provide a signal which, after being inverted by the phase inverting section 15, will activate an indicator device 28. This condition occurs when positive potential inputs are applied to the base electrodes of transistors 24 and 25. The base electrodes of the transistors 24 and 25 serve as first and second input means, respectively, for the gate circuit 14.

In order to maintain current flow through the Zener diode 27 at all times, the cathode electrode thereof is connected to the lead 16 via a lead 28, a resistor 29 and a lead 30. An operating point for the Zener diode 27 is thus established whereby a constant bias voltage is applied to the transistor 24 to stabilize the operation thereof.

The phase inverting section 15 is driven by the gate circuit 14 and comprises an NPN type transistor 31 having an emitter electrode connected to the lead 28 by means of a resistor 32 and having a collector electrode connected to lead 16 through a relay winding 33. The base electrode of transistor 31 is supplied with an input signal from a pair of resistors 34 and 35 serially connected between the resistor 26 and the lead 17. A midpoint between the resistors is connected to the base electrode of the transistor 31.

To the end that a forward bias voltage will be applied to the transistor 24 when none of the fault contact sets is closed, the pulse responsive gate control section 12 is provided. This section may include a current switching means 36 having a control electrode together with power electrodes which are interposed between the lead 16 and the base electrode of the transistor 24. In the present embodiment of the invention, switching means 36 is a silicon controlled switch (SCS) having an anode electrode connected to the lead 16 and a cathode electrode connected via a resistor 37 to the base electrode of an NPN type transistor 38 of the amplifying section 13. The anode gate electrode of the SCS 36 serves as a control electrode to render the SCS nonconducting.

In order to maintain the SCS 36 in a normally conducting condition, current must be supplied to its anode electrode. This is achieved by connecting the cathode gate electrode of the SCS 36 to the lead 16 through a diode 39, a resistor 40 and a resistor 41. A capacitor 42, paralleled by a resistor 42a, may be connected between the lead 17 and a point common to the diode 39 and the resistor 40 to aid in turning off the SCS 36 when a set of fault contact closes.

The capacitor 42 also causes the SCS to begin conducting after it has been turned off as will be explained presently. The resistors 42a, 40 and 41 form a resistive network in which the voltage developed across the resistor 42a and capacitor 42 is applied to the cathode gate electrode of the SCS 36. The connections of the SCS 36 are completed by a resistor 44 connected between the anode gate electrode and the lead 17.

The amplifying section 13 serves to multiply the output current of the SCS 36 and includes the NPN type transistor 38. The collector electrode of transistor 38 is connected to a point between resistors 40 and 41 while the emitter electrode of the transistor is connected to the base electrode of transistor 24 and to the lead 17 through a resistor 43. The base electrode of transistor 38 is connected to the resistor 37 as indicated previously so that forward bias is applied to transistor 38 when the SCS 36 conducts.

To the end that forward bias voltage will be applied to the transistor 25 during the time that any set of fault contacts is closed and reverse bias will be applied to the transistor 24 for a brief time after any set of fault contact closes, the fault signal conditioning circuit sections 10 and 11 are provided. The circuit 10 comprises a signal transmitting means such as a resistor 10 connected between a fault signal input terminal 46 and a connecting lead 47. Also included in circuit 10 is a pulse forming means comprising a capacitor 48 and a decoupling diode 49 serially connected between the signal input terminal 46 and a connecting lead 50. A resistor 51 is bridged across the diode 49 to provide a discharge path for capacitor 48.

Fault signal conditioning circuit 11 is identical to circuit 10 and like parts are identified by like numerals prefixed by the numeral 1. While only two fault conditioning circuits 10 and 11 are shown in the figure, it will be understood that as many such circuits as desired may be provided commensurate with the number of fault contact sets to be monitored.

To activate the indicator device 28 it is necessary for both transistors 24 and 25 of the gate section 14 to be forward biased. This causes both transistors 24 and 25 to conduct thus opening the gate section. In order that transistor 25 will be forward biased when any set of fault contacts is closed, the base electrode of transistor 25 is connected to lead 47 via a resistor 52. A resistor 53 is connected between the base and emitter electrodes of transistor 25 in order that current flow through the resistor 53 will produce a base-emitter voltage tending to turn on transistor 25.

It is desired to interrupt the conduction of transistor 24 for a brief time upon the closure of any set of fault contacts. This is accomplished by directing turn-off pulses to the anode electrode of the SCS 36 each time one of the fault contact sets closed. These turn-off pulses are developed on lead 50 by the pulse forming means of circuits 10 and 11 and are applied to the anode gate of SCS 36 by means of resistors 54 and 55 serially connected between the lead 50 and the anode gate of the SCS 36. A capacitor 56 may be bridged across the resistors 44 and 55 to protect the SCS 36 from excessive voltage spikes.

A fault contact set 57 is interposed between the signal input terminal 46 and a lead 58 connected to the positive pole of the D.C. source. Likewise, a fault contact set 157 is interposed between a signal input terminal 146 and the lead 58. These fault contact sets 57 and 157 are controlled by respective parameter monitoring circuits 59 and 159 which are commercially available devices. In the embodiment of the invention described herein, the parameter monitoring circuits cause their respective associated fault contact sets to close when parameters being monitored go out of limits.

The circuitry of the invention is completed by the provision of a movable contact arm 60 and a fixed contact 61 for the relay winding 33. The contact arm 60 and the fixed contact 61 are connected to the indicator device 28 so that when the contact arm 60 is in a released position against the fixed contact 61 the indicator device will be activated due to completion of a current circuit by the arm 60 and the contact 61. A diode 62 may be bridged across relay winding 33 to prevent damage to the transistor 31 from inductive kickback.

Operation of the foregoing circuit will now be described.

Assuming that the contact sets 57 and 157 are open, forward bias voltage will be applied to the cathode gate electrode of the SCS 36 from the lead 16 through the diode 39 and the resistors 40 and 41 until SCS 36 is rendered conducting. Consequently, current will flow from the lead 16 through the anode-cathode path of the SCS 36, resistor 37, the base-emitter path of the transistor 38 and the resistor 43 to the lead 17. The base-emitter current of the transistor 38 forward biases that transistor so that current flows from the lead 16 through the resistor 41, the collector-emitter path of the transistor 42, the base-emitter path of the transistor 24 and the Zener diode 27 to the lead 17.

The base-emitter current of the transistor 24 tends to render is conducting. However, no collector-emitter current can flow in the transistor 24 unless the transistor 25 is also rendered conducting. Thus, unless both transistors 24 and 25 conduct to draw substantial current through the transistor 26, there is very little voltage drop across the resistor 26.

Under the foregoing conditions, that is with the transistor 24 forward biased and the transistor 25 turned off, current flows from the lead 16 to the lead 17 through the resistors 26, 34 and 35. The voltage thus developed across the resistor 35 makes the base electrode of the transistor 31 positive with respect to the emitter electrode thereof causing the transistor 31 to conduct. As a result, current flows from the lead 16 through the winding 33, the collector-emitter path of the transistor 31, the resistor 32 and the Zener diode 27 to the lead 17. The current flow through the relay winding 33 causes the movable contact arm 60 to be pulled away from the contact 61. Consequently, the electrical circuit of the indicator device 28 is open and the indicator device is inactive.

From the foregoing, it will be seen that with the fault contacts 57 and 157 open, the SCS 36 will conduct causing the transistor 38 to conduct to forward bias the transistor 24. However, with the contacts 57 and 157 open, no forward bias voltage is applied to the transistor 25. As a result, the transistor 31 conducts causing the contact arm 60 to be pulled away from the contact 61 to deactivate the indicator device 28. Assuming that the fault contact set 57 now closes, a forward bias voltage will be applied to the transistor 25 from the lead 58 through the resistor 45, the lead 47, and the resistor 52. At the same time, a pulse of current flows from the lead 58 into the anode gate electrode of the SCS 36 through the fault signal input terminal 46, capacitor 48, the decoupling diode 49, lead 50, resistor 54, and the resistor 55. This current pulse occurs because, when the fault contact set 57 initially closes, the capacitor 48 is in a substantially discharged condition. Consequently, current can flow through the capacitor 48 until it becomes charged.

The pulse of current supplied to the anode gate electrode of the SCS 36 causes the SCS to turn off thereby rendering transistor 38 nonconducting and removing the forward bias from the transistor 24. Accordingly, it will be seen that immediately upon the closure of the contact set 57 the transistor 25 is forward biased but the transistor 24 is reversed biased. Therefore, no current is drawn through the resistor 26 by the transistors 24 and 25 and the transistor 31 continues to conduct as described previously.

When the current pulse which flows into the anode gate electrode of the SCS 36 renders SCS 36 and transistor 38 nonconducting, diode 39 remains reversed biased thus preventing any current flow in the cathode gate circuit of the SCS. After the termination of the current pulse supplied to the anode gate electrode, the SCS 36 will remain nonconducting until the capacitor 42 charges to a predetermined voltage great enough to forward bias the cathode gate of the SCS. Thus the capacitor 42 resistors 40 and 41 determine the off time of the SCS 36 after it is rendered nonconducting by the closure or any of the fault contact sets.

Conduction of the SCS 36 after the capacitor 42 has charged to a predetermined voltage renders the transistor 38 conducting so that forward bias voltage is applied to the transistor 24. Since both transistors 24 and 25 are now forward biased, current will flow from the lead 16 through the resistor 26, the collector-emitter path of the transistor 25, the collector-emitter path of the transistor 24 and the Zener diode 27 to the lead 17. The increased current flow through the resistor 26 as a result of the conduction of transistors 24 and 25 causes the end of the resistor 26 connected to the collector electrode of the transistor 25 to become substantially more negative than it was before the conduction of those transistors. This negative voltage is applied to the base electrode of the transistor 31 through the resistor 34 rendering the transistor 31 nonconducting. When the transistor 31 ceases conducting, no current flows through the relay winding 33. Consequently, the contact arm 60 is released and moves into a position against contact 61 thereby closing the circuit of the indicator device 28 to indicate that a fault has occurred.

Assuming that the fault contact set 157 closes now, the positive potential on the lead 58 will be applied to the base electrode of the transistor 25 through the fault signal input terminal 146, resistor 145, lead 47, and the resistor 52. However, this will not effect the conduction of the transistor 25 since forward bias voltage is already applied to that transistor from the fault signal conditioning circuit 10. Immediately upon closure of the fault signal contacts 157 a pulse of current flows from the lead 58 to the anode gate electrode of the SCS 36 via the signal input terminal 146, capacitor 148, decoupling diode 149, lead 50, resistor 54, and resistor 55. As described previously, this current pulse renders the SCS 36 nonconducting. Consequently, the transistor 38 is rendered nonconducting and the forward bias voltage is removed from the transistor 24 causing it to turn off. This causes a sharp reduction in the current flow through the resistor 26 thereby reducing the reverse bias voltage applied to the base electrode of the transistor 31. Therefore, transistor conducts. Conduction of transistor 31 causes current flow through the relay winding 33 to separate the movable contact arm 60 from the fixed contact 61 thereby deactivating the indicator device 28.

From the foregoing, it will be seen that closure of the contact set 157 subsequent to the closure of the contact set 57 renders the SCS 36 nonconducting. This causes the transistors 38 and 24 to turn off. When the transistor 24 becomes nonconducting, the transistor 31 conducts to deactivate the indicator device 28 as described previously. Thus, when the indicator device is activated due to a fault condition, a subsequent fault condition will deactivate the indicator device for a brief time to indicate that a subsequent fault has occurred. This deactivation of the indicator device upon occurrence of a subsequent fault, lasts only for a relatively short time as determined by the size of the capacitor 42. This results because the SCS 36 once rendered nonconducting remains in that state until the voltage across the capacitor 42 reaches a predetermined value.

When the contact set 157 closes subsequent to the closure of the contact set 57, the capacitor 148 and the decoupling diode 149 are connected substantially in parallel with the capacitor 48 and the decoupling diode 49. The decoupling diode 149 prevents the capacitor 148 from drawing current from the capacitor 48. Thus, upon the closure of the contacts at 157, current must flow as desired through the capacitor 148 and the diode 149 to the anode gate of the SCS 36. The bleed resistors 51 and 151 provide high resistance discharge paths for the capacitors 148 and 48, respectively, when the fault contact sets open.

While only two fault conditioning signal circuits 10 and 11 are shown in the single figure, it will be understood that as many such circuits as desired may be utilized with respective fault contact sets. It will also be clear that, while for purposes of explanation the contact set 57 was described as closing first, the fault contact set may close first.

It will be understood that changes and modifications may be made to the circuitry described above without departing from the spirit and scope of the invention as set forth in the claims appended hereto.

What is claimed is:

1. In an alarm circuit adapted to be energized from a D.C. source and provided with a plurality of fault signal input terminals connected to one side of the D.C. source through respective fault contact sets, in combination, indicating means, gate means having first and second input means, means for connecting said gate means to said indicating means to activate same when said first and second gate input means are concurrently supplied with input signals, a silicon controlled switch having its anode-cathode current path connected between one polarity of the D.C. source and said first gate input means, said silicon controlled switch having an anode gate electrode and a cathode gate electrode, a plurality of fault signal input means each including fault signal transmitting means connected between respective fault signal input terminals and said second input means of said gate, and pulse forming means connected between respective fault signal input terminals and said anode gate electrode, forward bias means, means for connecting said forward bias means to said cathode gate electrode to maintain said silicon controlled switch conducting except when a current pulse is supplied to said anode gate electrode from said pulse forming means.

2. The circuit of claim 1 in which said forward bias means comprises a resistive network connected across the D.C. source, a diode connected between the cathode gate electrode of the silicon controlled switch and a point on said resistive network, said diode being poled to permit current flow toward the cathode gate electrode, and a capacitor connected between said point on said resistive network to which said diode is connected and the other polarity of the D.C. source.

3. The circuit of claim 1 in which said fault signal transmitting means is a resistor and said pulse forming means comprises a serially connected capacitor and diode with a bleed resistor bridged across said diode.

4. The circuit of claim 3 in which said forward bias means comprises a resistive network connected across the D.C. source, a diode connected between the cathode gate electrode of the silicon controlled switch and a point on said resistive network, said diode being poled to permit current flow toward the cathode gate electrode, and a capacitor connected between said point on said resistive network to which said diode is connected and the other polarity of the D.C. source.

5. The circuit of claim 3 in which said gate means comprises a load resistor and first and second transistors, the collector-emitter paths of said transistors being serially connected with said load resistor across the D.C. source, the base electrodes of said first and second transistors being said first and second gate input signal means, respectively.

6. The circuit of claim 5 in which said forward bias means comprises a resistive network connected across the D.C. source, a diode connected between the cathode gate electrode of the silicon controlled switch and a point on said resistive network, said diode being poled to permit current flow toward the cathode gate electrode, a capacitor connected between said point on said resistive network to which said diode is connected and the other polarity of the D.C. source.

7. The circuit as set forth in claim 6 and including a phase inverting circuit comprising a transistor having collector, emitter and base electrodes, a relay having a winding and at least one movable contact arm and one fixed contact, means for connecting said contact arm and said fixed contact to the indicating means, said relay winding being connected between the collector electrode of said transistor and said one polarity of the D.C. source, constant voltage bias means connected between said emitter electrode and the other polarity of the D.C. source, a resistance network connected between the collector electrode of said second transistor of the gate means and said other polarity of the D.C. source, means for connecting the base electrode of the transistor to a point on said resistance network whereby the transistor of the phase inverting circuit is rendered nonconducting to deenergize the relay when both the first and second transistors of the gate means conduct.

References Cited

UNITED STATES PATENTS

| | | | |
|---|---|---|---|
| 3,184,725 | 5/1965 | Siegel | 340—213 |
| 3,252,154 | 5/1966 | McKee | 340—213 |
| 3,274,577 | 9/1966 | Stark | 340—213 |
| 3,307,166 | 2/1967 | Slack | 340—213 |
| 3,381,286 | 4/1968 | Walsh | 340—415 |

THOMAS B. HABECKER, Primary Examiner

U.S. Cl. X.R.

307—252